(12) United States Patent
Walther (10) Patent No.: US 9,038,460 B2
(45) Date of Patent: May 26, 2015

(54) INERTIAL UNIT WITH SEVERAL DETECTION AXES

(75) Inventor: Arnaud Walther, Grenoble (FR)

(73) Assignee: Commissariat à l'énergie atomique e aux énergies alternatives, Paris (FR)

( * ) Notice: Subject to any disclaimer, the term of this patent is extended or adjusted under 35 U.S.C. 154(b) by 317 days.

(21) Appl. No.: 13/459,592

(22) Filed: Apr. 30, 2012

(65) Prior Publication Data

US 2012/0279300 A1 Nov. 8, 2012

(30) Foreign Application Priority Data

May 2, 2011 (FR) ...................................... 11 53731

(51) Int. Cl.
*G01P 3/44* (2006.01)
*G01P 15/08* (2006.01)
*G01C 19/5712* (2012.01)
*G01C 19/5747* (2012.01)
*G01P 15/18* (2013.01)

(52) U.S. Cl.
CPC ............ *G01P 15/08* (2013.01); *G01C 19/5712* (2013.01); *G01C 19/5747* (2013.01); *G01P 15/18* (2013.01)

(58) Field of Classification Search
CPC ..................................................... G01P 15/18
USPC ...................................................... 73/504.03
See application file for complete search history.

(56) References Cited

U.S. PATENT DOCUMENTS

| 5,635,640 | A | 6/1997 | Geen | |
|---|---|---|---|---|
| 5,869,760 | A | 2/1999 | Geen | |
| 6,349,597 | B1* | 2/2002 | Folkmer et al. | 73/504.02 |
| 7,284,429 | B2* | 10/2007 | Chaumet et al. | 73/504.12 |
| 8,096,181 | B2* | 1/2012 | Fukumoto | 73/504.12 |
| 2007/0062282 | A1* | 3/2007 | Akashi et al. | 73/504.12 |
| 2007/0131030 | A1* | 6/2007 | Jeong et al. | 73/504.12 |
| 2008/0276706 | A1* | 11/2008 | Hartmann et al. | 73/504.04 |
| 2010/0116050 | A1* | 5/2010 | Wolfram | 73/504.12 |

(Continued)

FOREIGN PATENT DOCUMENTS

WO WO 2006/034706 A1 4/2006
WO WO 2009/062786 A1 5/2009

OTHER PUBLICATIONS

U.S. Appl. No. 13/459,618, filed Apr. 30, 2012, Walther et al.

(Continued)

*Primary Examiner* — Hezron E Williams
*Assistant Examiner* — Mark A Shabman
(74) *Attorney, Agent, or Firm* — Oblon, McClelland, Maier & Neustadt, L.L.P.

(57) ABSTRACT

Inertial unit for the measurement of accelerations and/or rotations comprising four sensors, spread out on two intersecting axes, each sensor comprising two inertial masses, each inertial mass comprising a moveable excitation part and a moveable detection part, the moveable excitation parts of a sensor being separate from those of the other sensors, said unit also comprising means for exciting the excitation parts of the sensors and means for detecting the movement of the detection parts, the two inertial masses of each sensor) being mechanically coupled, the four sensors being coupled by elastically deformable mechanical coupling means and able to transmit the excitation vibrations from one axis to the other.

31 Claims, 10 Drawing Sheets

(56) References Cited

U.S. PATENT DOCUMENTS

| | | |
|---|---|---|
| 2010/0132463 A1 | 6/2010 | Caminada et al. |
| 2011/0154898 A1* | 6/2011 | Cazzaniga et al. ......... 73/504.12 |
| 2011/0219875 A1 | 9/2011 | Walther et al. |
| 2012/0061172 A1 | 3/2012 | Yacine |

OTHER PUBLICATIONS

Preliminary Search Report issued Mar. 2, 2012 in French Application No. 1153731 (With English Translation of Category of Cited Documents).

Ranjith Amarasinghe, et al., "Development of miniaturized 6-axis accelerometer utilizing piezoresistive sensing elements", Sensors and Actuators A, vol. 134, 2007, pp. 310-320.

Yoshiyuki Watanabe, et al., "SOI micromachined 5-axis motion sensor using resonant electrostatic drive and non-resonant capacitive detection mode", Sensors and Actuators A, vol. 130-131, 2006, pp. 116-123.

Takao Murakoshi, et al., "Electrostatically Levitated Ring-Shaped Rotational-Gyro/Accelerometer", Jpn. J. Appl. Phys., vol. 42, 2003, pp. 2468-2472.

Nan-Chyuan Tsai, et al., "Fabrication and analysis of a micro-machined tri-axis gyroscope", J. Micromech. Microeng., vol. 18, 2008, 14 pages.

Yoshiyuki Watanabe, et al., "Five-axis motion sensor with electrostatic drive and capacitive detection fabricated by silicon bulk micromachining", Sensors and Actuators A, vol. 97-98, 2002, pp. 109-115.

* cited by examiner

INERTIAL UNIT WITH SEVERAL DETECTION AXES

TECHNICAL FIELD AND PRIOR ART

The present invention relates to a MEMS or NEMS inertial unit with several axes intended to detect angular velocities and/or accelerations along several axes.

Inertial units exist with five detection axes, three axes in acceleration and two axes in rotation. Such a unit is described in the document Y. Watanabe et al., *"Five axis motion sensor with electrostatic drive and capacitive detection fabricated with silicon bulk micromachining"*, Sensors and Actuators A, Vol. 97-98, p 109-115, 2002. On the one hand, this unit is made using volume technology, which makes its manufacture long and costly. On the other hand, the detection of all the detection and excitation axes are entangled. The processing of the data is then complex and a high risk of introducing errors exists, said risk being higher the more the capacitive detection by variation of air gap is non-linear, this non-linearity being amplified when the movements are of high amplitude, which is the case of excitation movements. Moreover, the measurement precision is higher the lower the capacitive air gap, yet the actuation requires important air gaps to obtain significant amplitudes.

The document 20100132463 describes an inertial unit formed of three integrated gyrometers, comprising three pairs of inertial masses and an oscillating disc that makes it possible to have two directions of excitation movement in the plane. This unit has the advantage compared to a unit comprising three separate gyrometers of having simpler electronics, in particular it only requires a single excitation control loop. Two pairs of masses are dedicated to the detection of the Coriolis forces around axes contained in the plane of the unit and a pair of masses is dedicated to the detection of the Coriolis forces around the axis normal to the plane. However these pairs of masses are also sensitive to accelerations, which perturbs the measurement of the Coriolis forces. Moreover, this unit does not enable the measurement of acceleration.

DESCRIPTION OF THE INVENTION

It is consequently an aim of the present invention to offer an inertial unit capable of detecting rotations and/or accelerations along at least four axes with simplified electronics in excitation and in reading and in which the detection of rotation and the detection of acceleration are relatively independent of each other.

The aforementioned aim is attained by an inertial unit comprising at least four inertial sensors, two sensors being aligned on a first axis and two sensors being aligned on a second axis.

Each sensor comprises a pair of inertial masses, the masses of each pair being connected together by a mechanical coupling and the sensors are mechanically coupled together. Advantageously, the mechanical coupling between the masses of each pair is a strong coupling.

The sensors may be gyrometers or dynamic accelerometers. Due to the implementation of two inertial masses in each sensor, they are relatively insensitive to rotation in the case of an accelerometer and relatively insensitive to acceleration in the case of a gyrometer. Thus, the processing of the detection signals is simplified, it is not necessary to separate the signals to obtain the acceleration and/or rotation velocity values. Moreover, by mechanically coupling the sensors together, a single excitation control loop is required. The control electronics of the unit is thus simplified and the precision of the measures made is good.

In other words, an inertial unit is formed with at least four inertial sensors mechanically coupled so as to transmit the excitation to the four sensors; the sensors may be accelerometers chosen so as to be relatively insensitive to Coriolis forces and/or gyrometers, these being chosen so as to be relatively insensitive to accelerations.

Thanks to the invention, an inertial unit may be formed with six detection axes capable of measuring the accelerations in the three axes of the space and the Coriolis forces around three axes of the space in a quasi-independent manner, with a reduced surface compared to a structure with six independent sensors.

Advantageously, the coupling means are formed so as to have a centre of symmetry and the sensors are chosen so as to have a similar structure and operation. Moreover, their relative arrangement is chosen preferably to offer a substantially symmetrical inertial unit.

The subject matter of the present invention is then an inertial unit for the measurement of accelerations and/or rotations comprising at least four sensors, distributed by pairs on at least two intersecting axes, each sensor comprising two inertial masses, each inertial mass comprising a moveable excitation part and a moveable detection part, the moveable excitation parts of a sensor being separate from those of the other sensors, said unit also comprising means for detecting the excitation parts of the sensors and means for detecting the movement of the detection parts, and a control unit of the excitation means and detection means, the two inertial masses of each sensor being coupled mechanically by coupling means, called intra-sensor coupling means, said unit also comprising mechanical coupling means between the four sensors, called inner-sensor coupling means, said inner-sensor coupling means being elastically deformable and able to transmit the excitation vibrations from one axis to the other. At least one of the sensors is an accelerometer.

The intra-sensor coupling means and the inner-sensor coupling means are separate.

The excitation means may be shared for all of the sensors or independent from one sensor to the other.

Said intra-sensor coupling means are in a preferential manner strong coupling means.

Said inner-sensor coupling means can be situated at the intersection of axes bearing the two pairs of sensors, the two sensors of each pair being arranged on either side of said inner-sensor coupling means.

Preferably, the two axes are perpendicular.

Advantageously, the inner-sensor coupling means are strong coupling means.

The inner-sensor coupling means are for example connected to the excitation part of one of the masses of each sensor.

The inner-sensor coupling means may comprise an assembly of beams comprising at least one closed pattern.

In an embodiment example, the closed pattern has the shape of a diamond, each top of said diamond being connected to a mass of a sensor.

The intra-sensor coupling means connect for example the two excitation parts of each sensor.

Preferably, the excitation part of each sensor is excitable in a single direction.

The inertial unit may comprise one or more gyrometers and/or one or more accelerometers, said at least gyrometer and/or accelerometer being able to measure a rotation and/or an acceleration along an axis called detection axis.

The inertial unit may comprise a rigid rod in rotation around an axis orthogonal to the detection axis, said rigid rod connecting the two detection parts of the masses of the accelerometer.

Preferably, the intra-sensor coupling means between two masses of a gyrometer form a strong coupling in antiphase, and the intra-sensor coupling means between two masses of an accelerometer form a strong coupling in phase.

In an embodiment example, the intra-sensor coupling means in antiphase comprise a closed assembly of beams.

For example, the intra-sensor coupling means in phase comprise a rigid connection, the two masses of a same accelerometer acting as a single mass.

In an embodiment example, the gyrometer(s) comprise a rigid rod in rotation around the detection axis around which the rotation is to be detected connecting the detection parts of the inertial masses.

At least one of the sensors may be replaced by an object not supplying a measurement on the acceleration or the rotation and ensuring a balancing of the inertial unit.

The inertial unit according to the present invention may comprise three pairs of sensors, the sensors of each pair being aligned on an axis, two of the axes being parallel and the other axis being intersecting to the two parallel axes, first inner-sensor coupling means being provided at the level of each intersection of one of the axes parallel with the other axis and second inner-sensor coupling means being provided between the first inner-sensor coupling means.

In one embodiment example, the inertial unit comprises three gyrometers and three accelerometers, the three gyrometers being connected directly to first inner-sensor coupling means different to the first inner-sensor coupling means to which are connected directly the three accelerometers.

In another embodiment example, the inertial unit comprises eight sensors, the inner-sensor coupling means comprising an assembly of eight patterns of juxtaposed diamond shape, the patterns being connected by one of their tops in a point constituting a centre of symmetry of the coupling structure, so as to have opposite patterns and aligned two by two, the tops of the patterns opposite to the centre of symmetry each being intended to be integral with a mass of eight sensors.

The excitation means are for example of electrostatic, piezoelectric or magnetic type and the detection means are of capacitive, piezoelectric, magnetic or piezoresistive type.

In an advantageous manner, the detection means are chosen of same type for all of the sensors.

The control unit may advantageously comprise a unique excitation control loop for all of the sensors and means for detecting the displacement of the detection parts.

The control unit may comprise means for reading the detection means of the different sensors by time division multiplexing.

BRIEF DESCRIPTION OF DRAWINGS

The present invention will be better understood by means of the description given hereafter and the appended drawings in which.

DETAILED DESCRIPTION OF PARTICULAR EMBODIMENTS

In FIGS. 1, 2A, 2B and 3 may be seen an embodiment example of an inertial unit 2 according to the present invention with four axes.

The axes X, Y and Z are defined as follows:

the axes X and Y define the plane of the inertial unit, in the representations these are contained in the plane of the sheet, and the axis Z is perpendicular to the plane of the unit, and to the plane of the sheet in the representations.

Figure 1:
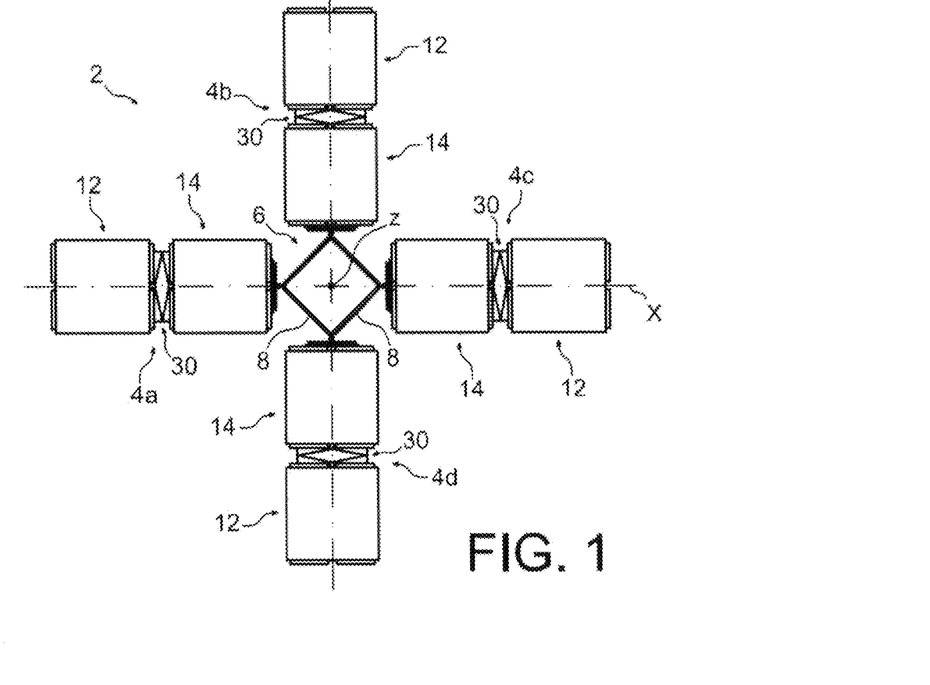
FIG. 1 is a top view of an embodiment example of an inertial unit according to the present invention with 4 axes.

The inertial unit 2 comprises four sensors 4a, 4b, 4c and 4d distributed two by two on the two perpendicular axes X and Y.

A unit in which the sensors are distributed on intersecting but non perpendicular axes does not go beyond the scope of the present invention.

The sensors 4a to 4d may be gyrometers or accelerometers.

The unit 2 comprises mechanical coupling means 6 between the four sensors 4a to 4d so as to link in movement the masses of all of the sensors.

In the example represented, the mechanical coupling means 6 are formed by a structure of four beams 8 forming a diamond, each top 10a to 10d of which is connected to a sensor 4a to 4d. Each of the diagonals of the diamond is aligned with one of the axes X and Y of the inertial unit.

In a variant, the coupling means could form a square or an ellipse, in the latter case the large axis would be aligned on the axis X or Y, and the small axis would be aligned on the axis Y or X.

Thus, a vibratory movement generated by an excitation signal at one of the tops or at two tops opposite one of the axes X, Y is transmitted to two other tops situated on the other axis Y, X.

In the remainder of the description, the expressions "strong coupling" and "weak coupling" will be used to qualify the mechanical couplings between the sensors, and between the masses of a same sensor.

In the present application, "strong coupling" between two moveable masses is taken to mean a mechanical connection such that if a first mass is displaced by an amplitude A0, leading to a displacement of the second mass by an amplitude A1, then the second mass is displaced by an amplitude A1 leading to a movement of an amplitude A2 on the first mass, the amplitudes A0 and A2 are substantially the same.

"Weak coupling" between two moveable masses is taken to mean a mechanical connection such that A2 is less than A0.

Examples of sensors 4a to 4d that can be implemented in the inertial unit will now be described.

Figure 4:
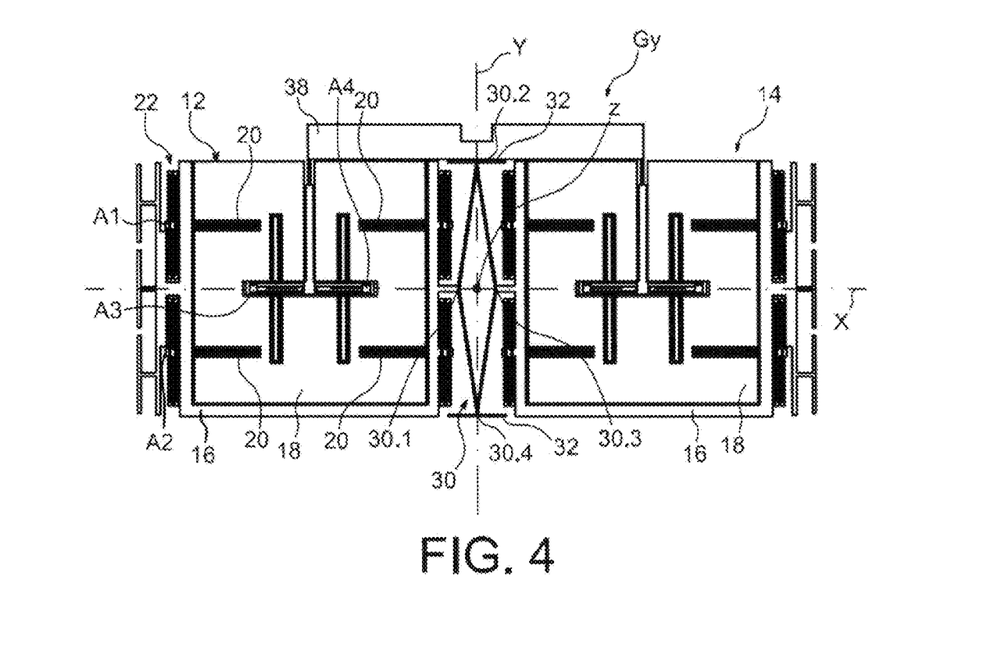
FIG. 4 is a top view of an inertial sensor which can form a gyrometer and which can be implemented in the unit of FIG. 1.

In FIG. 4 may be seen an embodiment example of a gyrometer which can be implemented in the inertial unit of FIG. 1. The gyrometer is a gyrometer Z, i.e. it makes it possible to detect the rotation around the axis Z, for example for this it is excited along the axis X and the detection takes place along the axis Y or inversely.

The gyrometer comprises two inertial masses 12, 14 moveable with respect to a substrate.

The mass 12 comprises two parts 16, 18 moveable with respect to each other. In the example represented, the first part 16 is box shaped and surrounds on three sides the second part 18.

The box 16 is suspended from the substrate and the second part is arranged inside the box 16 and is suspended from it by beams 20.

The first moveable part 16 is anchored on the substrate for example at the level of the points A1, A2.

Elastic suspension means 22 are provided between the anchoring points A1, A2 and the first part 16 enabling it to vibrate along the axis X.

The sensor comprises means 24 for exciting the first moveable part. In the example represented, the excitation means 24 are provided laterally. Said excitation means may be of the electrostatic type with interdigitated combs, piezoelectric, magnetic means, etc.

Advantageously, the first moveable excitation part 16 has a single degree of freedom in displacement along the excitation axis, along the axis X in the example represented. This moveable part 16 is connected to the coupling means. This only moves advantageously in excitation, which makes it possible to only couple the excitations and not to have detection couplings which would induce perturbations between sensors.

The coupling means are fixed to the excitation part.

The second moveable part 18 is, for its part, mounted articulated around a pivot 26 of axis parallel to the axis Z orthogonal to the plane of the sensor. In the example represented, the second moveable part 18 is connected to the pivot 26, this liaison will be described later. Preferably, anchoring points A3, A4 are provided in the unit part of the second moveable part 18 to ensure the guiding. Elastic means are then provided between said anchoring points A3, A4 and the second part 18.

Means for detecting (not represented) the displacement of the second part 18 are provided, they are for example of capacitive, piezoelectric, magnetic, piezoresistive type. For example, piezoresistive gauges may be provided on either side of the pivot 26 and to measure the variation in electrical resistance of the gauges and thereby detect the variation in length and deduce thereof the amplitude of displacement of the second parts 18. Preferably, the same types of detection means are provided for all of the sensors in order to simplify the realisation and the processing of the detection signals.

In an alternative manner, the second part may, itself, be formed of several sub-parts. For example it may comprise a first frame connected to the first excitation part, said first frame moves in excitation in an integral manner with the first excitation frame and has a degree of freedom in detection. A second frame, anchored or not according to the excitation mode, sees all the detection movement of the second frame or a part thereof transmitted.

The second mass 14 has substantially the same structure as the first and will not be described in detail.

Moreover the sensor comprises strong coupling means 30 between the two masses 12, 14 along the axis X and connecting the two first parts 16. The strong coupling means 30 are of the type in antiphase, i.e. when the masses are excited, they move apart or closer together in phase. Moreover, the coupling being strong, they have the same amplitude of displacement.

In the example represented, the strong coupling means 30 comprise a closed structure of beams in diamond shape, two opposite tops 30.1, 30.3 being connected to the first parts 16 of each of the masses.

The two other tops 30.2, 30.4 are connected to beams 32, perpendicular to a straight line connecting the tops 30.2 and 30.4 at the level of the central beam area. The beams are anchored on the substrate at their ends. The coupling means 30 deform along the axis X and enable the masses to move apart and closer together along the axis X.

Advantageously, the two second parts are connected to the pivot 26 via a rigid rod 38 in rotation around an axis parallel to the detection axis, which makes it possible to reduce very considerably the sensitivity of the gyrometers to the accelerations.

Figure 5:
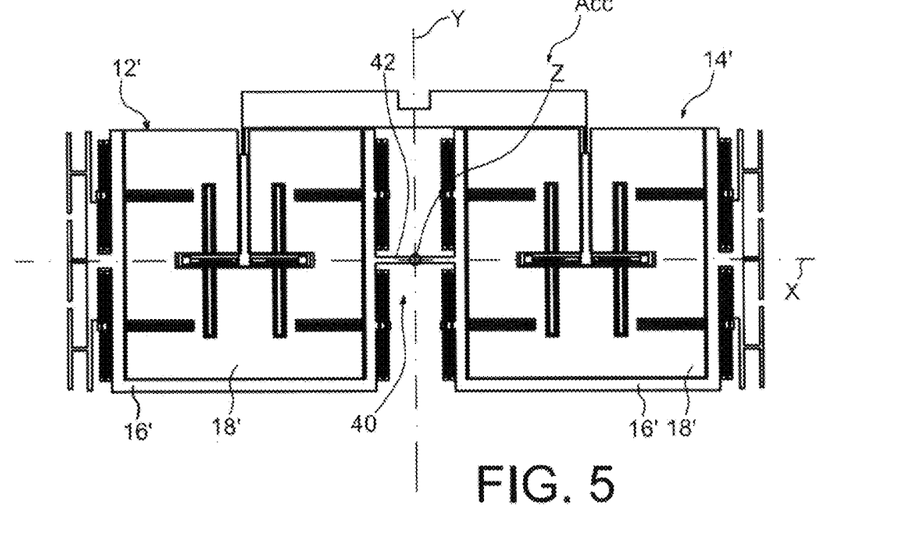
FIG. 5 is a top view of an inertial sensor which can form an accelerometer and which may be implemented in the unit of FIG. 1.

In FIG. 5 may be seen an embodiment example of an accelerometer Y, which signifies that an excitation signal is applied along the axis X, and the detection signal is a displacement in rotation around Z.

Preferably, an accelerometer is chosen in which the structure and the mode of operation are similar to those of gyrometers. The accelerometer is of the dynamic type and is excited in detection, in a similar manner to a gyrometer. Thus, the same excitation control loop may be applied to all of the sensors and use the same detection means.

The structure of the accelerometer of FIG. 5 is very similar to that of the gyrometer of FIG. 4. It comprises two masses 12', 14', each comprising at least one first moveable excitation part 16' and in the case of the accelerometer, this comprises strong coupling means 40 in phase; i.e. that the masses move in the same direction along the same direction and with the same amplitude. In a particular manner, the accelerometer implemented in the inertial unit according to the present invention is of the dynamic type, i.e. it comprises excitation means whereas, generally, accelerometers do not require such means to operate.

In the example represented, the strong coupling means in phase are formed by a rigid rod type connection, connected to each of the first moveable parts 16', simplifying the manufacture of the sensor.

The coupling means 6 between the sensors are, in the example represented, weak coupling means. These are particularly visible in FIGS. 2A and 2B.

For reasons of simplification, in FIGS. 1, 7A, 8A and 10 the masses are represented schematically and the two moveable parts of each mass are not detailed.

For example, the gyrometer of FIG. 4 is fixed to the top 10a of the diamond by one of its masses 12, 14.

In the remainder of the description, the gyrometers will be designated by Gy and the accelerometers by Acc.

Figure 2A:
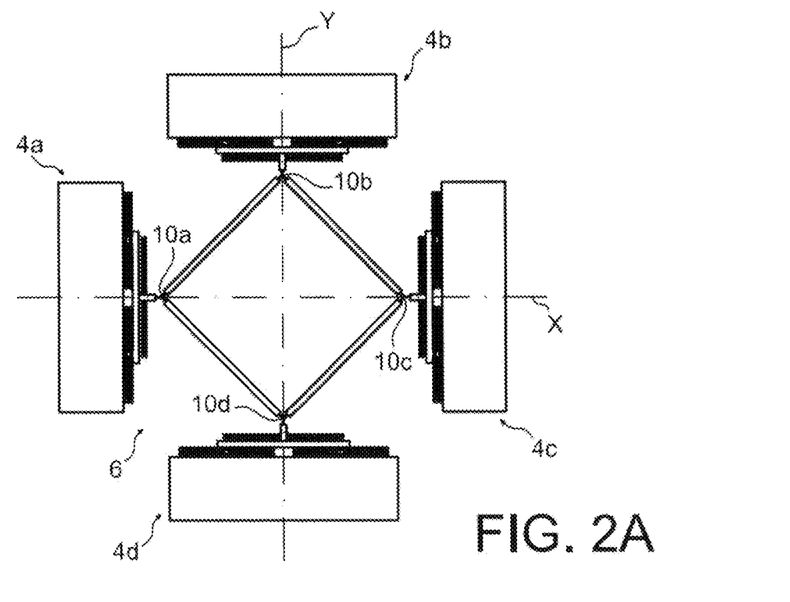
FIGS. 2A and 2B are detailed views of FIG. 1.
Figure 2B:
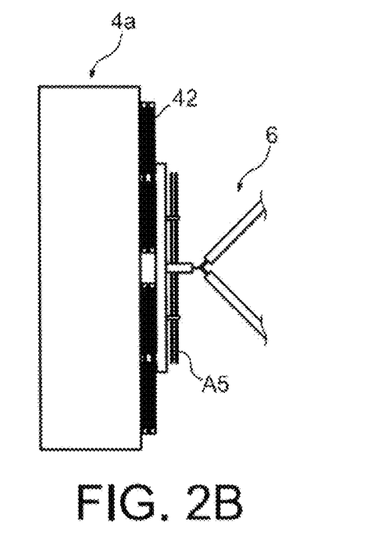

In FIG. 2B may be seen the details of an example of connection between the coupling means 6 and one of the masses of the sensor. This connection takes place through elastic means 42 between an edge of the mass and a beam on which is fixed the top 10a. Advantageously, an anchoring A5 is formed at the level of the beam to improve the longitudinal guiding.

Figure 3:
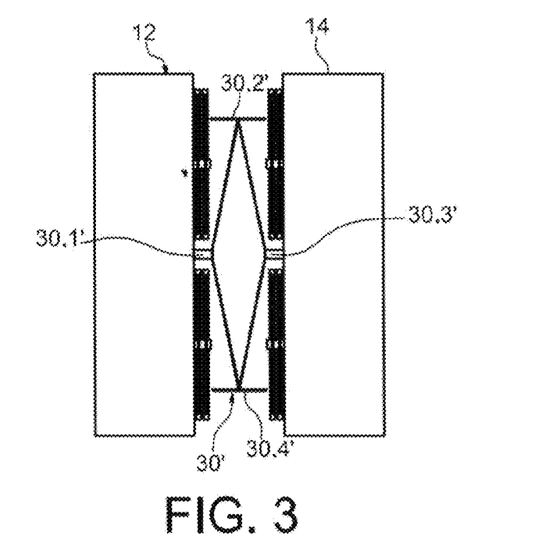
FIG. 3 is another detailed view of FIG. 1.

In FIG. 3 may be seen in detail the strong coupling 30' in antiphase between two masses of gyrometers of the structure of FIG. 1. The coupling has the shape of a diamond connected by two tops 30.1', 30.3' opposite to the two masses and its two other tops 30.2', 30.4' are connected to beams perpendicular to the straight line connecting the two tops 30.2' and 30.4', at the central beam area. The beams are anchored on the substrate at their ends.

The coupling means between the sensors are advantageously strong coupling means, ensuring there is a same amplitude at the level of the sensors, even in the case where the unit comprises gyrometers and accelerometers.

According to the invention, the two differential measurement parts of each sensor are situated side by side on the same side of the inner-sensor coupling means, which makes it possible to couple the two detection parts and in particular to use strong coupling means, such as a rigid rod in rotation around a pivot, which makes the sensor very insensitive to parasite signals.

By way of example, if the gyroscope of FIG. 4 is considered, an acceleration along the axis Y creates a force on each detection mass, but these two forces balance out on the rigid coupling rod 38. The acceleration signal will thus not be measured by the detection means. In the same way, on the accelerometer of FIG. 5, the rigid coupling rod makes it possible to balance the Coriolis forces that exerts on each of the masses.

The implementation of strong intra-sensor couplings enables the amplitudes of the two masses of each sensor to be equal, the couples exerted for example on the strong coupling rigid rod 38 are then equal, which makes the sensors the most robust possible to parasite signals.

Figure 6:
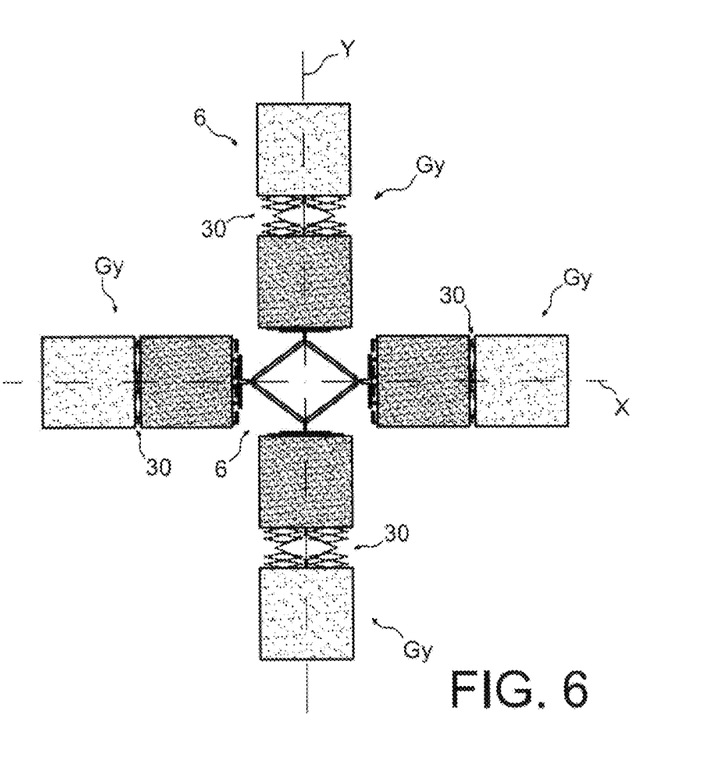
FIG. 6 is a graphical representation of the simulation of the excitation displacement of the masses of the inertial unit of FIG. 1 in an excitation resonance mode, the structure comprising four gyrometers coupled with a weak coupling.

In FIG. 6 may be seen a simulation of the excitation displacement of the masses of the inertial unit of FIG. 1 in an excitation resonance mode, comprising four gyrometers.

The rectangular elements represent the masses. The grey level of the masses illustrates their amplitude of displacement, the higher the grey level, the greater the amplitude. In the case of the structure of the unit of FIG. 1, it will be noted that all of the masses have substantially the same amplitude, (the grey levels being similar), in particular the two masses of each gyrometer have the same amplitude. This is what is sought after within the scope of the present invention. This is obtained thanks to the strong coupling between the masses. Moreover it may be remarked that the strong coupling within a same sensor is effectively in antiphase.

In the case of the unit of FIG. 1 which comprises four detection axes, and in the case where the sensors are either all gyrometers, or all accelerometers, one of the sensors is redundant. However it ensures there is a balanced structure.

In a variant, it could be envisaged to replace a sensor by an object having the function of balancing the structure. Said object would have the same mass, the springs would have the same stiffness. However, it would not comprise a detection part, i.e. the excitation and detection parts would be merged and the structure would not comprise a rod 38, or detection means such as electrodes, gauges, etc.

In a variant, the unit may comprise three gyrometers and an accelerometer, two gyrometers and two accelerometers, or one gyrometer and three accelerometers.

Figure 7A:
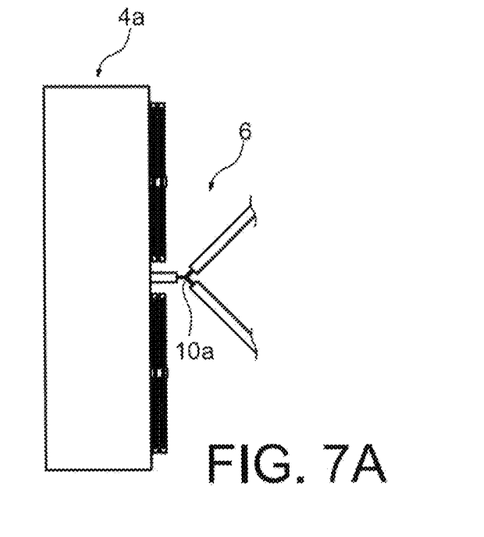
FIG. 7A is a detailed view of an inertial unit according to a variant of FIG. 1 in which the sensors are coupled with a strong coupling, FIG. 7B a graphical representation of the simulation of the excitation displacement of the masses of the inertial unit of FIG. 7A in an excitation resonance mode, the structure comprising four gyrometers.

In FIG. 7A may be seen a detail of example of strong coupling between the sensors, in this case, the top 10a is rigidly connected directly to the mass, and not through the intermediary of elastic means.

Figure 7B:
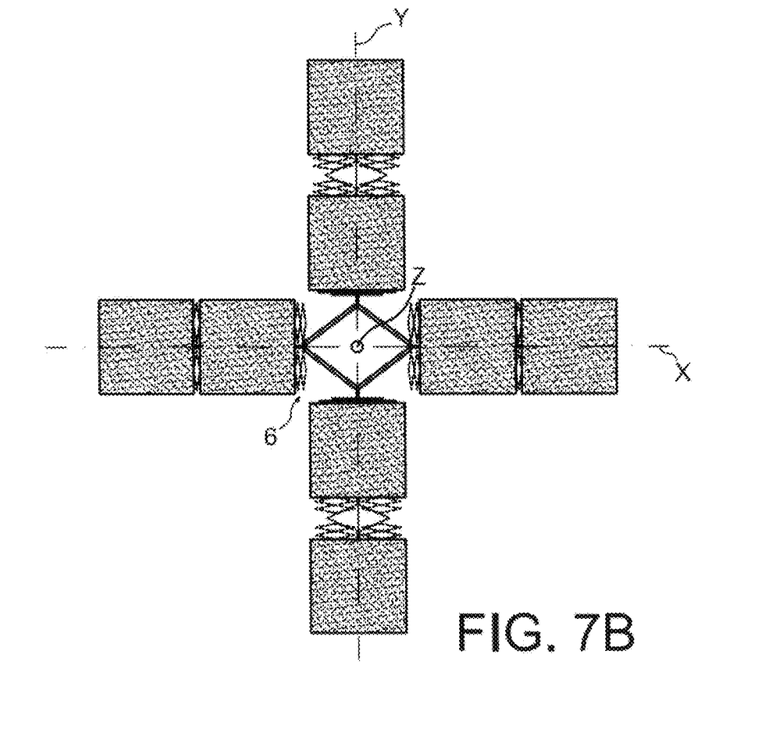

In FIG. 7B may be seen a simulation of the excitation displacement of the masses of an inertial unit comprising strong couplings between the sensors as represented in FIG. 7A, in an excitation resonance mode, comprising four gyrometers coupled together by a strong coupling. Moreover, the couplings between the masses of a same gyrometer are strong and in antiphase. It may be noted that the masses have effectively all the same amplitude of displacement.

Figure 7C:
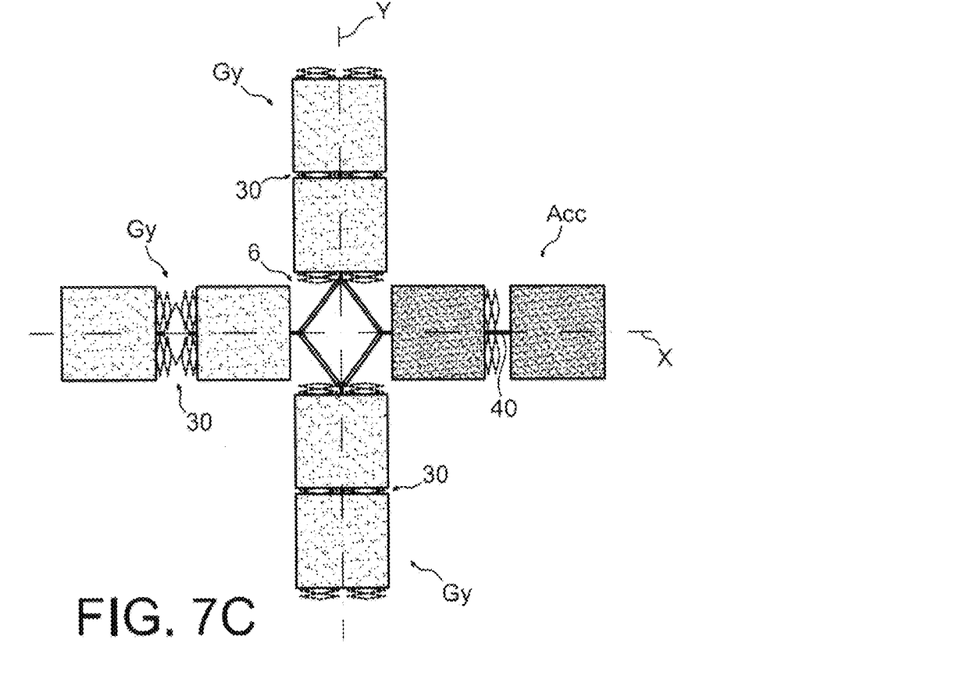
FIG. 7C is a graphical representation of the simulation of the excitation displacement of the masses of the inertial unit of FIG. 7A in an excitation resonance mode, the structure comprising three gyrometers and an accelerometer.

In FIG. 7C may be seen a simulation of the excitation displacement of the masses of the inertial unit of FIG. 7A in an excitation resonance mode, comprising three gyrometers and an accelerometer. The two masses of each gyrometer are coupled by a strong coupling in antiphase and the two masses of the accelerometer are coupled by a strong coupling in phase, which is formed in the example represented by a rigid rod. The sensors, between them, are coupled by a strong coupling. Once again, all of the masses have substantially the same amplitude of displacement.

Figure 7D:
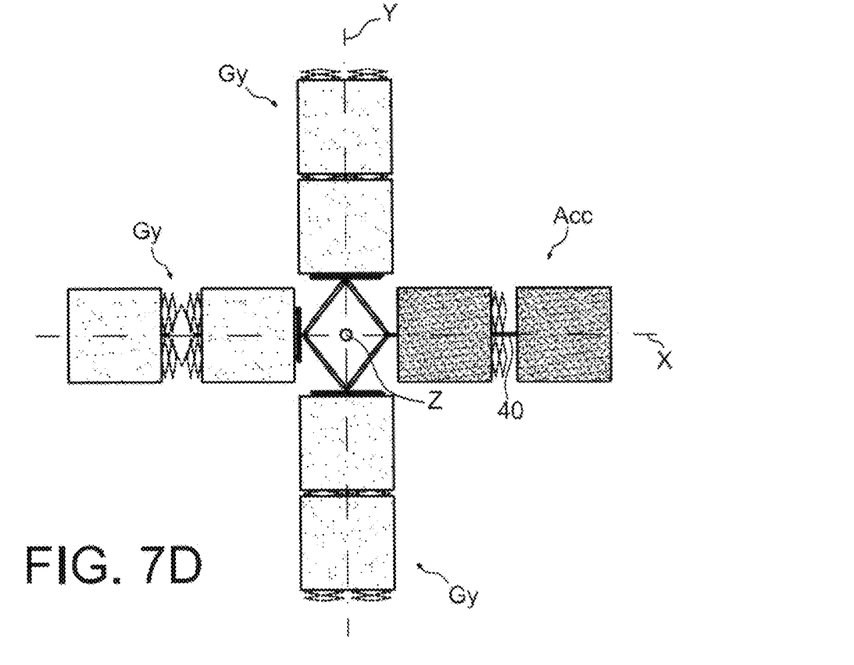
FIG. 7D is a graphical representation of the simulation of the excitation displacement of the masses of a variant of the inertial unit of FIG. 7A in an excitation resonance mode, the structure comprising three gyrometers and an accelerometer coupled with a weak coupling.

In FIG. 7D, may be seen a simulation of the excitation displacement of the masses of a variant of the inertial unit of FIG. 7A in an excitation resonance mode, comprising three gyrometers and an accelerometer. The two masses of each gyrometer are coupled by a strong coupling in antiphase and the two masses of the accelerometer are coupled by a strong coupling in phase, which is formed in the example represented by a rigid rod. On the other hand, unlike the case of FIG. 7C, the sensors between them are coupled by a weak coupling of the type of that represented in FIG. 2B.

It may be observed that the masses of the three gyrometers have substantially the same amplitude of displacement, and that the two masses of the accelerometer have the same amplitude of displacement which is different to that of the masses of the gyrometers. This situation is interesting since the masses in each sensor always have the same amplitude of displacement.

The inventors have noted that an inertial structure in which the masses of each sensor were coupled together by a weak coupling did not make it possible to operate with simplified electronics because the masses of each sensor did not move with the same amplitude.

The operation of such a unit will now be explained.

The excitation means of the sensors are activated, for example those of the sensors 4a and 4c are activated, which brings about a vibration of the first moveable parts of the sensors 4a, 4c directly excited and the second moveable parts of the sensors 4a, 4c. In the case of gyrometers, the two masses of sensors 4a, 4c vibrate in antiphase, in the case of accelerometers they vibrate in phase. Moreover, due to the coupling means 6 between the two sensors 4a, 4c aligned on the axis X and the two sensors 4b, 4d aligned on the axis Y, their masses directly connected to the coupling means are made to vibrate, as well as the masses coupled by the strong coupling means. The masses of the sensors 4b, 4d then vibrate in antiphase in the case of gyrometers and in phase in the case of accelerometers.

In a practical manner, the excitation means are arranged in a symmetrical manner on the structure and more particularly at the level of the masses, however it is possible to only excite one mass, i.e. only one excitation part 16, which is sufficient to make the whole assembly move in the desired manner.

Consequently, a single control loop is implemented to excite the assembly of moveable masses of the sensors.

The moving masses are excited by the excitation means acting on the first parts.

Due to the accelerations and rotations or Coriolis forces, the second parts of the moveable masses are brought into movement; in the case of the sensors represented, the moving parts pivot around pivots 26. This displacement is detected by the detection means, for example piezoresistive gauges. Since each sensor has a good robustness, due to their structure with two inertial masses, the detection of the rotations discriminate relatively well the accelerations and conversely, the processing of the signals detected and the detection electronics are simplified. In the case of three or four gyrometers, the Coriolis forces in the three directions of the space are determined, and the same is true for the acceleration in the case of three or four accelerometers.

In the case where the unit comprises two gyrometers and two accelerometers, preferably the two gyrometers are aligned and the two accelerometers are aligned in order to improve the balancing of the structure.

In the case where the coupling means between the sensors are strong coupling means, and whatever the type of sensors, they all have the same amplitude as is represented in FIG. 7C.

In the case of a weak coupling, the sensors of the same type have the same amplitude. For example in the case where the unit comprises three gyrometers and an accelerometer, the accelerometer does not have the same amplitude of displacement.

However, thanks to the strong coupling between the masses of each sensor, the masses of a same sensor have the same amplitude of displacement, as is represented in FIG. 7D. Correction means at the level of the processing of the signals detected make it possible to determine the acceleration.

Figure 8A:
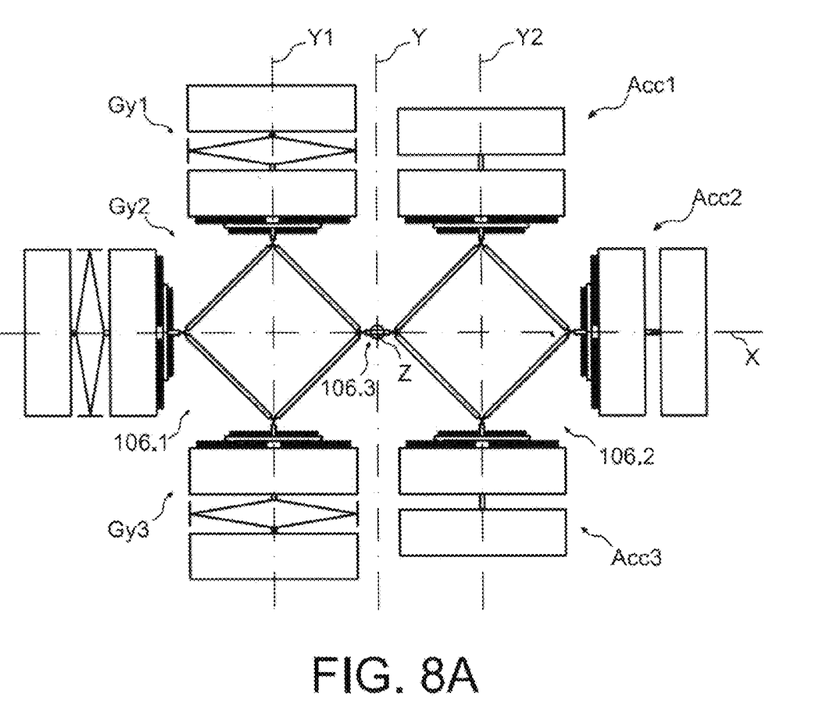
FIG. 8A is a top view of an embodiment example of an inertial unit with six axes.

In FIG. 8A may be seen an embodiment example of an inertial unit according to the present invention with 6 detection axes.

The unit comprises six sensors, three gyrometers Gy1, Gy2, Gy3 and three accelerometers Acc1, Acc2, Acc3.

Two gyrometers Gy1 and Gy3 are aligned on an axis Y1, two accelerometers Acc1 and Acc3 are aligned on an axis Y2 parallel to the axis Y1, and a gyrometer Gy2 and an accelerometer Acc2 are aligned on an axis X.

Coupling means 106.1 connect the three gyrometers and coupling means 106.2 connect the three accelerometers, and coupling means 106.3 connect the three gyrometers and the three accelerometers.

In the example represented, the coupling means 106.1 and 106.2 are strong coupling means having the same structure, i.e. diamond shape. The coupling means 106.3 are also strong coupling means and are formed by a beam or rod type rigid connection.

Other strong coupling structures may be provided between the three gyrometers and the three accelerometers. For example, a structure of beams laid out in diamond shape connecting the two tops facing the diamonds of coupling means 106.1, 106.2 or in ellipse could be provided.

In another embodiment example, the coupling means 106.1, 106.2 and 106.3 may also be weak coupling means. Or alternatively certain coupling means may be strong coupling means and others weak coupling means.

The structure of FIG. 8A is particularly interesting in the case of an embodiment in a non-isotropic material but having an orthogonal symmetry such as monocrystalline silicon, the structure of FIG. 8A then makes it possible to have identical properties of the material on the different sensors, which have different orientations, in the example represented of orientations at 90° to each other.

Figure 8B:
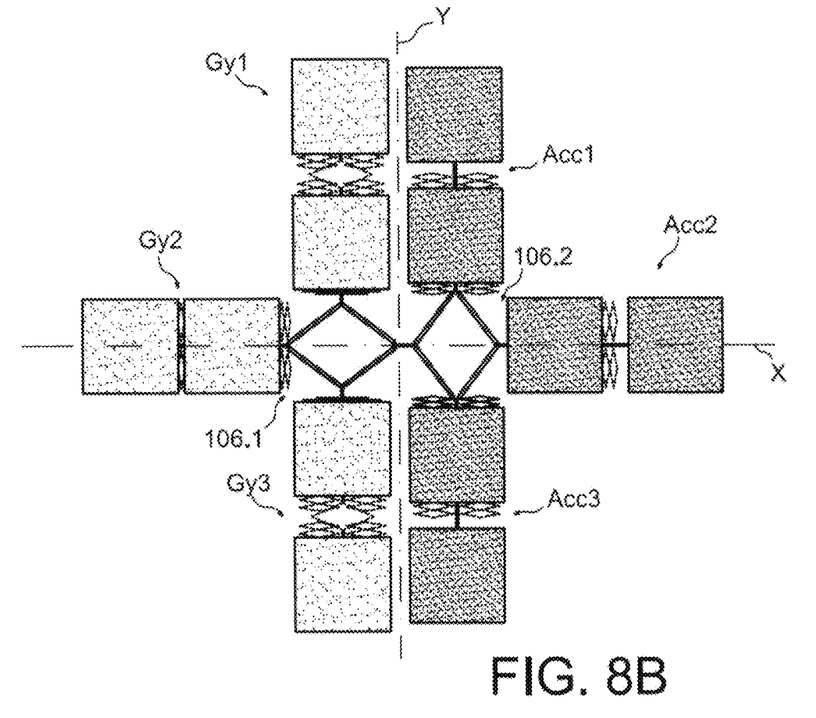
FIG. 8B is a graphical representation of the simulation of the excitation displacement of the masses of the inertial unit of FIG. 8A in an excitation resonance mode.

In FIG. 8B, may be seen a simulation of excitation displacement of the masses of the inertial unit of FIG. 8A in an excitation resonance mode, it may be observed that the masses of the accelerometers all have the same amplitude and those of the gyrometers are also all the same amplitude.

Figure 9A:
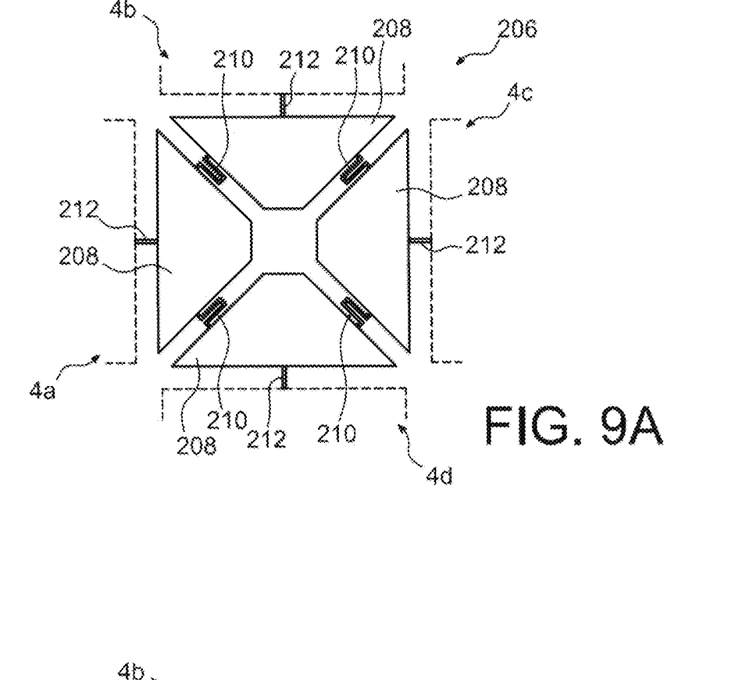
FIGS. 9A and 9B are top views of embodiment variants of inner-sensor coupling means.
Figure 9B:
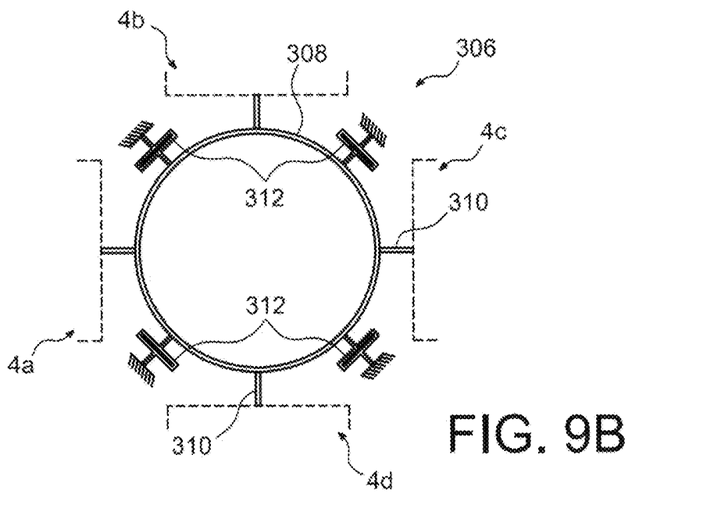

In FIGS. 9A and 9B are represented embodiment variants of coupling means between the sensors of the unit. In the two variants, it is weak coupling means.

In FIG. 9A, the coupling means 206 comprise four trapeze shaped elements 208 arranged so as to reconstitute substantially a square shape, the large bases forming the sides of the square.

The four trapezes are connected to each other by their non parallel sides by means of elastic elements 210.

Each trapezoidal element is, for its part, connected to the sensors 4a to 4d by a longitudinally rigid beam type connection 212.

In FIG. 9B, the coupling means 306 are formed by a circle shaped structure 308 connected to each of the sensors by a longitudinally rigid beam type connection 310. Moreover, the circle 308 is anchored on the substrate by four elastic means 312 aligned two by two, each anchoring being arranged between two rigid connections with the sensors.

Figure 10:
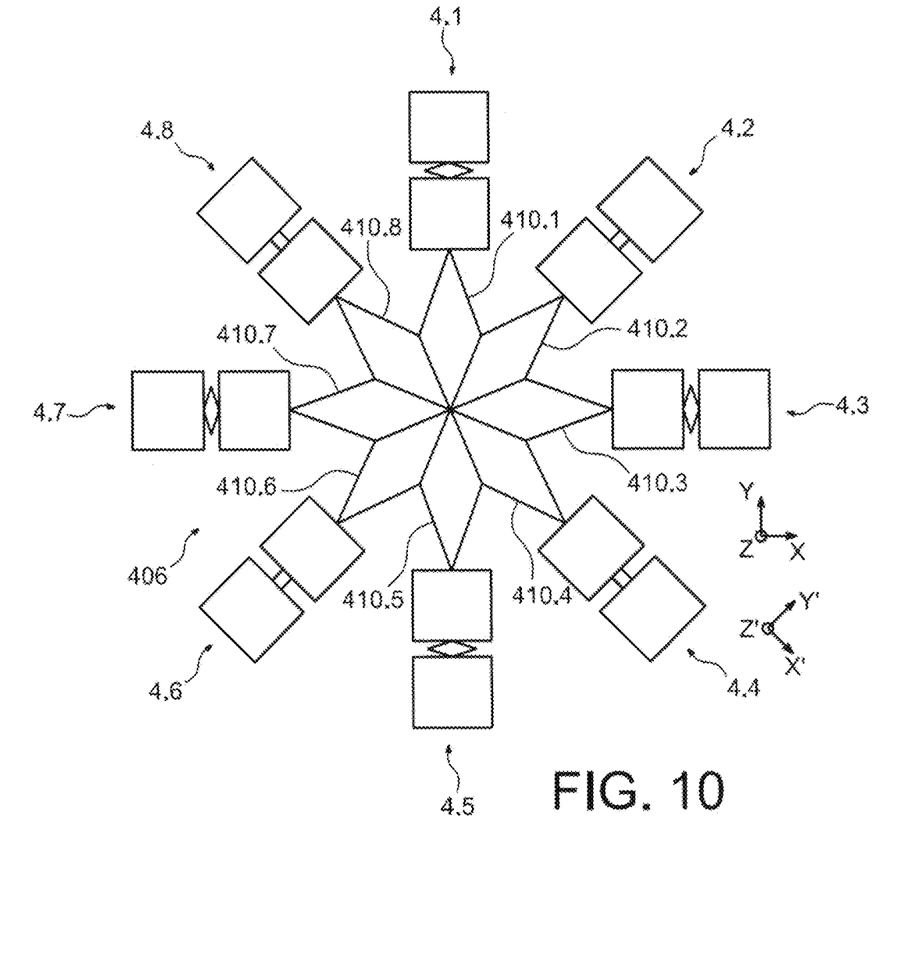
FIG. 10 is a top view of an embodiment example of an inertial unit with height axes.

In FIG. 10 may be seen another example of unit having height detection axes.

In this embodiment example, the coupling means 40 between sensors have a structure formed of beams laid out so as to form eight identical diamonds 410.1 to 410.8 having a shared top forming the centre of symmetry of the structure, and each diamond 410.1 to 410.8 having a side shared with the adjacent diamond. The coupling structure then has the shape of a star with eight branches.

The sensors 4.1 to 4.8 are then integral with the structure at the level of the tops of the branches of the star.

By way of example, the sensors may be spread out as follows:
  the sensor 4.1 is a gyrometer X,
  the sensor 4.2 is an accelerometer Z',
  the sensor 4.3 is a gyrometer Z,
  the sensor 4.4 is an accelerometer Z',
  the sensor 4.5 is a gyrometer Z,
  the sensor 4.6 is an accelerometer X',
  the sensor 4.7 is a gyrometer Y,
  the sensor 4.8 is an accelerometer Y'.

It may be noted that, in this case, the axes X, Y of the gyrometer and X', Z' of the accelerometer are shifted by an angle of 45°.

The sensors described in FIGS. 4 and 5 are gyrometers Z and accelerometers X or Y, the axis of the pivot being oriented along the axis Z. To form gyrometers X or Y and accelerometers Z', the structures of the sensors are such that the axes of the pivots of the moveable masses are contained in the plane XY, the moveable masses move outside of the plane of the inertial unit. The structure of these sensors is not described in detail but this is well known to those skilled in the art.

The star structure with eight branches is balanced. In a variant, the redundant gyrometer Z and the accelerometer Z' could be replaced by objects uniquely ensuring the balancing of the structure.

The present invention offers an inertial unit capable of detecting up to 6 axes and offering a high level of integration. It enables an important surface gain compared to a unit composed of sensors simply assembled and without coupling between them. Moreover, it offers a high alignment precision compared to assembled sensors.

In addition, due to the coupling of the sensors and their structure and similar mode of operation, it is possible to manage all of the sensors by a single electronic, with a single excitation loop and a same reading electronic, this both for the accelerometers and the gyrometers.

As regards the detection reading, it is possible to carry out a reading of the different axes by time division multiplexing, i.e. by carrying out a reading of the detection means of the different sensors one after the other at a frequency substantially higher than the frequency of the excitation movement.

Moreover, the "cross axis" sensitivities are reduced and they can be easily optimised thanks to the use of separate structures dedicated to the detection of each axis, these structures each having two moveable masses.

Preferably, the structure of the unit is balanced by arranging an even number of structures of sensors such that the structures facing each other have the same coupling (either in phase or in phase opposition) and the same mass actuated in excitation, for example an accelerometer is aligned with an accelerometer and a gyrometer is aligned with a gyrometer as in the case of the inertial unit of FIG. 10.

An example of method of making an inertial unit according to the present invention, with electrostatic excitation and with capacitive detection, will now be described.

In FIGS. 11A to 11D are schematically represented the steps of the method of making an internal unit.

Figures 11A, 11B:
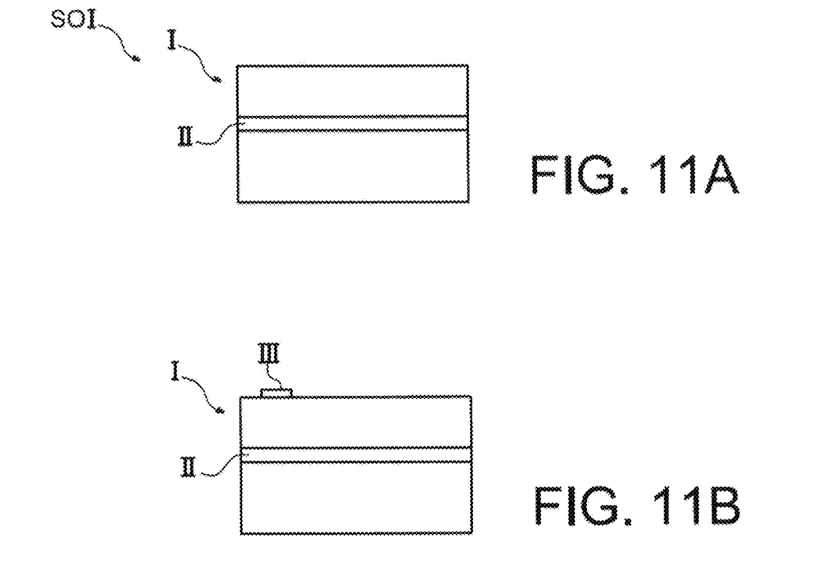
FIGS. 11A to 11D are schematic representations of different steps of an example of method of making an inertial unit according to the present invention.

For example, an SOI substrate is used, represented in FIG. 11A, the upper silicon layer I of which has a thickness comprised between 5 μm and 100 μm and the layer of buried oxide II of which is comprised between 0.5 μm and 5 μm.

During a first step represented in FIG. 11B, a metallic deposition on the upper layer of silicon I is carried out, for example with AlSi, gold, etc., of a typical thickness comprised between 100 nm and 2 μm. Then a lithography is carried out on this layer in order to demarcate the contact pads III from contact II pads and the conductor tracks and an etching of the metal layer is carried out. The resin on the remaining metal layer is eliminated.

Figure 11C:
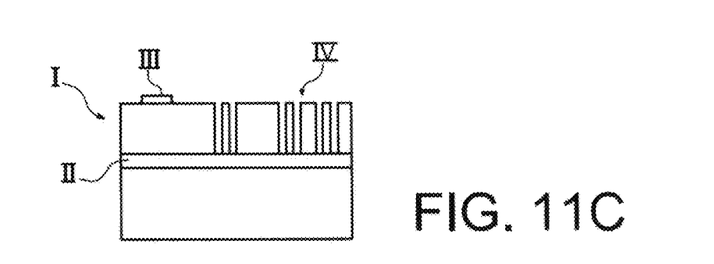
Figure 11D:
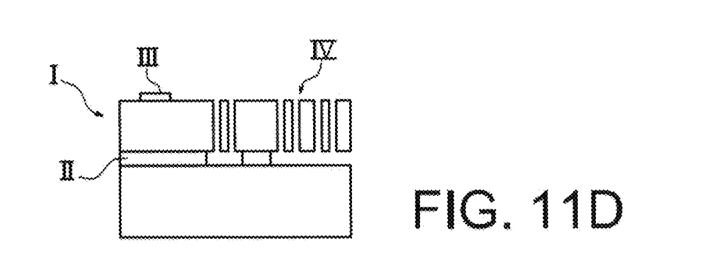

During a following step represented in FIG. 11C, the mechanical part IV is defined, i.e. the moveable masses and the mechanical coupling means, by lithography of the upper layer of silicon I.

A deep etching of the layer I is then carried out with stoppage on the buried oxide II.

The resin remaining on the layer of silicon I is eliminated.

A release of the moveable masses and coupling means IV is then carried out by elimination of the oxide of the layer II situated underneath the etched silicon, for example with hydrofluoric acid vapour. The released structure is shown schematically in FIG. 11D.

This method is given uniquely by way of example, and is in no way limiting.

The invention claimed is:

1. An inertial unit for the measurement of accelerations and/or rotations comprising:
    at least four sensors, at least one of which is an accelerometer, distributed by pairs on at least two intersecting axes, including a first pair of sensors on a first axis and a second pair of sensors on a second axis, the second axis intersecting the first axis, each sensor comprising two inertial masses, each inertial mass comprising a moveable excitation part and a moveable detection part, the moveable excitation parts of a sensor being separate from those of the other sensors, the two inertial masses of each sensor being mechanically coupled by an intra-sensor coupling structure,
    excitation means for exciting the excitation parts of the sensors and
    detection means for detecting the movement of the detection parts,
    a control unit to control the excitation means and to control the detection means,
    a mechanical inner-sensor coupling structure between the four sensors, said inner-sensor coupling structure being elastically deformable and able to transmit the excitation vibrations from one axis to the other,
    wherein at least one of the intra-sensor coupling structures is a strong coupling means.

2. The inertial unit according to claim 1, in which all of said intra-sensor coupling structures are strong coupling means.

3. The inertial unit according to claim 1, in which said inner-sensor coupling structures are situated at the intersection of the axes bearing the two pairs of sensors, the two sensors of each pair being arranged on either side of said inner-sensor coupling structure.

4. The inertial unit according to claim 1, in which the at least two axes are perpendicular.

5. The inertial unit according to claim 1, in which the inner-sensor coupling structure is a strong coupling structure.

6. The inertial unit according to claim 1, in which the inner-sensor coupling structure is connected to the excitation part of one of the masses of each sensor.

7. The inertial unit according to claim 1, in which the inner-sensor coupling structure comprises an assembly of beams comprising at least one closed pattern.

8. The inertial unit according to claim 7, in which the closed pattern has the shape of a diamond, each top of said diamond being connected to a mass of a sensor.

9. The inertial unit according to claim 1, in which the intra-sensor coupling structures connect the two excitation parts of each sensor.

10. The inertial unit according to claim 1, in which the excitation part of each sensor is excitable in a single direction.

11. The inertial unit according to claim 1, comprising one or more gyrometers and/or one or more accelerometers, said at least gyrometer and/or accelerometer being able to measure a rotation and/or an acceleration along an axis called a detection axis.

12. The inertial unit according to claim 11, comprising a rigid rod in rotation around an axis orthogonal to the detection axis, said rigid rod connecting the two detection parts of the masses of the accelerometer.

13. The inertial unit according to claim 11 or 12, the intra-sensor coupling structure between two masses of a gyrometer forming a strong coupling in antiphase, and the intra-sensor coupling structure between two masses of an accelerometer forming a strong coupling in phase.

14. The inertial unit according to claim 13, in which the intra-sensor coupling structure in antiphase comprises a closed assembly of beams.

15. The inertial unit according to claim 13, in which the intra-sensor coupling structure in phase comprises a rigid connection, the two masses of a same accelerometer acting as a single mass.

16. The inertial unit according to claim 12, the intra-sensor coupling structure between two masses of a gyrometer forming a strong coupling in antiphase, and the intra-sensor coupling structure between two masses of an accelerometer forming a strong coupling in phase.

17. The inertial unit according to claim 16, in which the intra-sensor coupling structure in antiphase comprises a closed assembly of beams.

18. The inertial unit according to claim 16 or 17, in which the intra-sensor coupling structure in phase comprises a rigid connection, the two masses of a same accelerometer acting as a single mass.

19. The inertial unit according to claim 11, in which the gyrometers(s) comprise a rigid rod in rotation around the detection axis around which the rotation is to be detected connecting the detection parts of the inertial masses.

20. The inertial unit according to claim 1, in which at least one of the sensors is replaced by an object not supplying a measurement on the acceleration or the rotation and ensuring a balancing of the inertial unit.

21. The inertial unit according to claim 1, comprising three pairs of sensors, the sensors of each pair being aligned on an axis, two of the axes being parallel and the other axis being intersecting to the two parallel axes, a first inner-sensor coupling structure being provided at the level of each intersection of one of the axes parallel with the other axis and a second inner-sensor coupling structure being provided between the first inner-sensor coupling structure.

22. The inertial unit according to claim 21, comprising three gyrometers and three accelerometers, the three gyrometers being connected directly to the first inner-sensor coupling structure different from the first inner-sensor coupling structure to which are connected directly the three accelerometers.

23. The inertial unit according to claim 1, comprising eight sensors, the inner-sensor coupling means comprising an assembly of eight patterns in juxtaposed diamond shape, the patterns being connected by one of their tops in a point constituting a centre of symmetry of the coupling structure, so as to have patterns opposite and aligned two by two, the tops of the opposite patterns at the centre of symmetry being intended to be each integral with a mass of eight sensors.

24. The inertial unit according to claim 1, in which the excitation means are of electrostatic, piezoelectric or magnetic type and the detection means are of capacitive, piezoelectric, magnetic or piezoresistive type.

25. The inertial unit according to claim 1, in which the detection means are chosen of same type for all of the sensors.

26. The inertial unit according to claim 1, in which the control unit comprises a single control loop in excitation for all of sensors and means for detecting the displacement of the detection parts.

27. The inertial unit according to claim 1, in which the control unit comprises means for reading the detection means of the different sensors by time division multiplexing.

28. The inertial unit according to claim 1, in which the strong coupling means mechanically couples two inertial masses of the accelerometer such that the two inertial masses of the accelerometer move with a same amplitude.

29. The inertial unit according to claim 28, in which the strong coupling means includes a rigid rod connecting the two inertial masses of the accelerometer.

30. The inertial unit according to claim 1, in which at least one of the four sensors is a gyroscope and the strong coupling means mechanically couples two inertial masses of the gyroscope such that the two inertial masses of the gyroscope move apart or closer together in phase along a same axis and with a same amplitude.

31. The inertial unit according to claim 30, in which the strong coupling means includes a rigid rod connecting the two inertial masses of the gyroscope.

* * * * *